US006356409B1

(12) United States Patent
Price et al.

(10) Patent No.: US 6,356,409 B1
(45) Date of Patent: Mar. 12, 2002

(54) BALANCING APPARATUS AND METHOD FOR HIGH SPEED HARD DISK DRIVE SPINDLES

(75) Inventors: Kirk B. Price; Andrew K. Hanlon, both of San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/461,894

(22) Filed: Dec. 15, 1999

(51) Int. Cl.[7] .......................... G11B 25/04; G01M 1/32

(52) U.S. Cl. .................... 360/98.07; 73/470; 360/99.08

(58) Field of Search .......................... 360/98.07, 99.08; 369/264; 73/461, 468, 469, 470

(56) References Cited

U.S. PATENT DOCUMENTS

| | | | |
|---|---|---|---|
| 1,211,488 A | * | 1/1917 | Reed |
| 2,334,285 A | | 11/1943 | Philippi |
| 3,817,088 A | | 6/1974 | Herbig |
| 3,854,347 A | | 12/1974 | Hellerich |
| 4,003,265 A | | 1/1977 | Craig et al. |
| 4,522,612 A | | 6/1985 | Frazer |
| 4,561,035 A | | 12/1985 | McDorman et al. |
| 5,111,713 A | | 5/1992 | Cameron et al. |
| 5,130,870 A | | 7/1992 | Jabbari |
| 5,167,167 A | | 12/1992 | Tiernan, Jr. et al. |
| 5,391,952 A | | 2/1995 | Simazu et al. |
| 5,422,776 A | | 6/1995 | Thorson et al. |
| 5,555,144 A | | 9/1996 | Wood et al. |
| 5,636,091 A | * | 6/1997 | Asano .................. 360/106 |
| 5,810,527 A | * | 9/1998 | Jager et al. .............. 409/141 |
| 5,903,540 A | * | 5/1999 | Ro et al. ................. 369/263 |
| 6,125,098 A | * | 9/2000 | Osawa ................... 369/266 |
| 6,243,351 B1 | * | 6/2001 | Huang ................... 369/263 |

FOREIGN PATENT DOCUMENTS

| | | | |
|---|---|---|---|
| DE | 29 23 800 A1 | * | 12/1979 |
| DE | 36 15 903 A1 | * | 2/1987 |
| EP | 0718839 A2 | | 6/1996 |
| FR | 2 202 290 | * | 6/1974 |
| GB | 2276699 A | | 10/1994 |
| JP | 59191248 | | 10/1984 |
| JP | 3290890 | | 12/1991 |

OTHER PUBLICATIONS

IBM Technical Disclosure Bulletin "Method for Spindle Balancing using Eccentric Spring Washers", vol. 39, Issue 6, pp. 217–218, Jun. 1, 1996.*

* cited by examiner

Primary Examiner—William Klimowicz
(74) Attorney, Agent, or Firm—Robert B. Martin; Bracewell & Patterson, L.L.P.

(57) ABSTRACT

A balancing mechanism for the spindle of a computer hard disk drive uses two, substantially flat wire clips at each end of the disk pack. The clips are designed so that one clip in each pair nests concentrically inside the other clip in the pair. Each clip is provided with a substantially identical imbalance in the installed position. If the imbalance vectors of each clip at one end of the disk pack are oriented 180 degrees apart, the resulting imbalance at that end of the pack is zero. Conversely, if the imbalance vectors are oriented at the same angle, the imbalance is maximized. Thus, the resolution of the imbalance provided by the clips is theoretically infinite between these limits, up to the precision of the clips. The orientation of the imbalance vector is controlled by the angle of the pair of clips relative to an index mark on the disk pack. The magnitude of the desired counterbalance is controlled by rotating the clips in each pair relative to each other. The cross-sectional shape of each pair of clips can be varied, and include the following examples: rectangular cross-sections having a generally flat profile, cross-sections with nesting grooves and ridges, and wire that is concave on one side and convex on the other side.

9 Claims, 4 Drawing Sheets

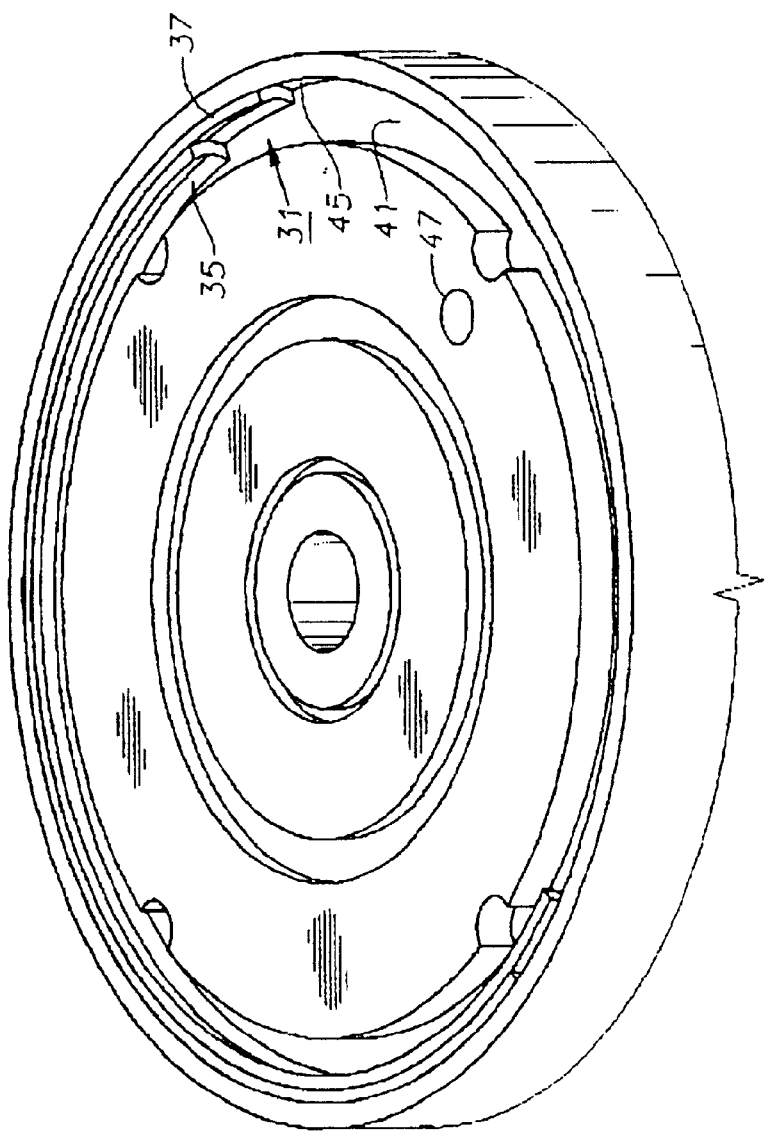
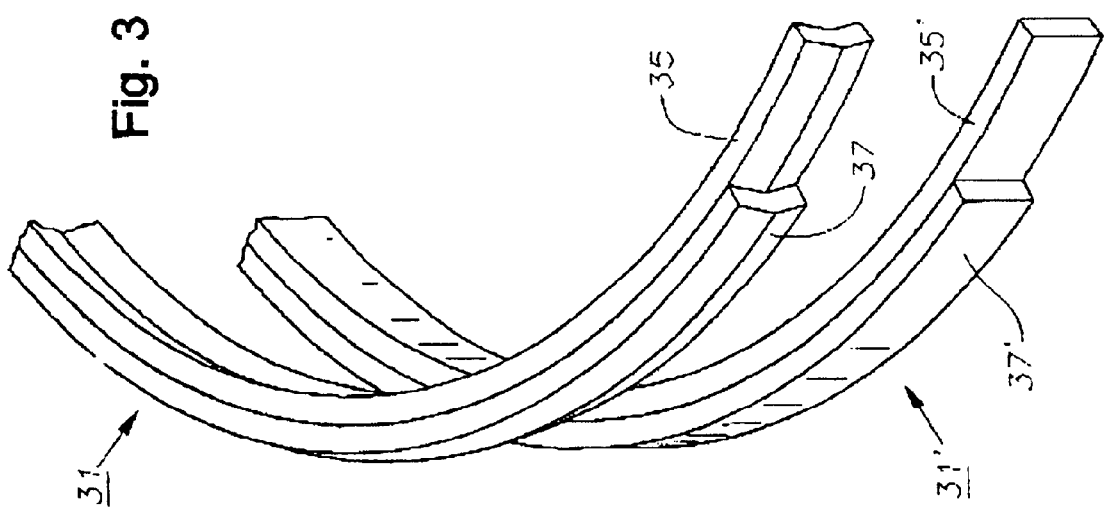

BALANCING APPARATUS AND METHOD FOR HIGH SPEED HARD DISK DRIVE SPINDLES

BACKGROUND OF THE INVENTION

1. Technical Field

This invention relates in general to balancing devices that move at high rotational speeds, and in particular to an improved apparatus and method for precision balancing of spindles in high speed computer hard disk drives.

2. Description of Related Art

Generally, a digital data access and storage system consists of one or more storage devices that store data on storage media such as magnetic or optical data storage disks. In magnetic disk storage systems, a storage device is called a hard disk drive (HDD), which includes one or more hard disks and an HDD controller to manage local operations concerning the disks. Hard disks are rigid platters, typically made of aluminum alloy or a mixture of glass and ceramic, covered with a magnetic coating. Typically, two or three platters are stacked vertically on a common spindle that is turned by a disk drive motor at several thousand revolutions per minute (rpm).

The only other moving part within a typical HDD is the head assembly. Within most drives, one read/write head is associated with each side of each platter and flies just above or below the platter's surface. Each read/write head is connected to a semi-rigid arm apparatus which supports the entire head flying unit. More than one of such arms may be utilized together to form a single armature unit.

Each read/write head scans the hard disk platter surface during a "read" or "write" operation. The head/arm assembly is moved utilizing an actuator which is often a voice coil motor (VCM). The stator of a VCM is mounted to a base plate or casting on which is also mounted the spindle supporting the disks. The base casting is in turn mounted to a frame via a compliant suspension. When current is fed to the motor, the VCM develops force or torque which is substantially proportional to the applied current. The arm acceleration is therefore substantially proportional to the magnitude of the current. As the read/write head nears the desired track, a reverse polarity signal is applied to the actuator, causing the signal to act as a brake, and ideally causing the read/write head to stop directly over the desired track.

One major determinant in HDD performance is the rotational speed of the spindle. Increased rotational speed reduces the time required to access a given piece of data on the disks. Unfortunately, increased rotational speed also magnifies any residual imbalance that is present in the disk pack. The force generated by such imbalances is proportional to the square of the rotational speed. Thus, doubling the rotational speed of the spindle increases the imbalance force by four times.

Imbalance forces in HDD spindles have at least two deleterious effects. The first effect is the resulting vibration in either the HDD having the imbalance, or in an adjacent HDD if the imbalanced HDD is operating in an array of drives. Vibration reduces the track-following capability of drives and, thus, their performance. The second effect of imbalance forces is the increase in acoustics that results from an imbalance force interacting with the structure of the system using the imbalanced HDD.

In the prior art, several solutions have been devised to balance HDD's. Most of the solutions utilize some type of discrete elements that are selectable by mass. The discrete elements are carefully positioned about the top and/or bottom of the spindle as needed to correct the imbalance in top or bottom plane(s), respectively. Examples of the discrete elements used by these solutions include: balls, wire or flat sheet metal clips that are inserted into grooves; extra screws that are selectively fastened to an array of holes in the spindle; and lumps of heavy adhesive applied to the spindle at appropriate locations. One general problem with each of these methods is the inherent, limited resolution of discrete elements. The balance-correcting resolution of these methods is limited by the increments available between the elements, and by the range of masses available to the technician correcting the imbalance. Other problems with these solutions include the following: potential drive contamination concerns due to the additional holes or apertures in the spindle; snapping balls into grooves requires very precise control of the ball size and groove geometry; and the messiness of adhesives during the manufacturing process along with rework difficulties.

At least one prior art solution avoids the use of discrete elements altogether. This method detects the imbalance of the spinning disks and taps on the disk drive enclosure to carefully shift the disks with respect to the center of rotation of the spindle. Although tapping on the drive enclosure has theoretically infinite resolution, it is limited to correcting imbalances in a single plane. Thus, an improved solution for correcting imbalances in HDD spindles is needed.

SUMMARY OF THE INVENTION

A balancing mechanism for the spindle of a computer hard disk drive uses two, substantially flat wire clips at each end of the disk pack. The clips are designed so that one clip in each pair nests concentrically inside the other clip in the pair. Each clip is provided with a substantially identical imbalance in the installed position. If the imbalance vectors of each clip at one end of the disk pack are oriented 180 degrees apart, the resulting imbalance at that end of the pack is zero. Conversely, if the imbalance vectors are oriented at the same angle, the imbalance is maximized. Thus, the resolution of the imbalance provided by the clips is theoretically infinite between these limits, up to the precision of the clips. The orientation of the imbalance vector is controlled by the angle of the pair of clips relative to an index mark on the disk pack. The magnitude of the desired counterbalance is controlled by rotating the clips in each pair relative to each other. The cross-sectional shape of each pair of clips can be varied, and include the following examples: rectangular cross-sections having a generally flat profile, cross-sections with nesting grooves and ridges, and wire that is concave on one side and convex on the other side.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 3 is an enlarged isometric view of the balancing mechanisms of FIG. 2.

FIG. 4 is an isometric view of the balancing mechanisms of FIG. 2 in operation on a spindle of the hard disk drive of FIG. 1.

BEST MODE FOR CARRYING OUT THE INVENTION

Figure 1:
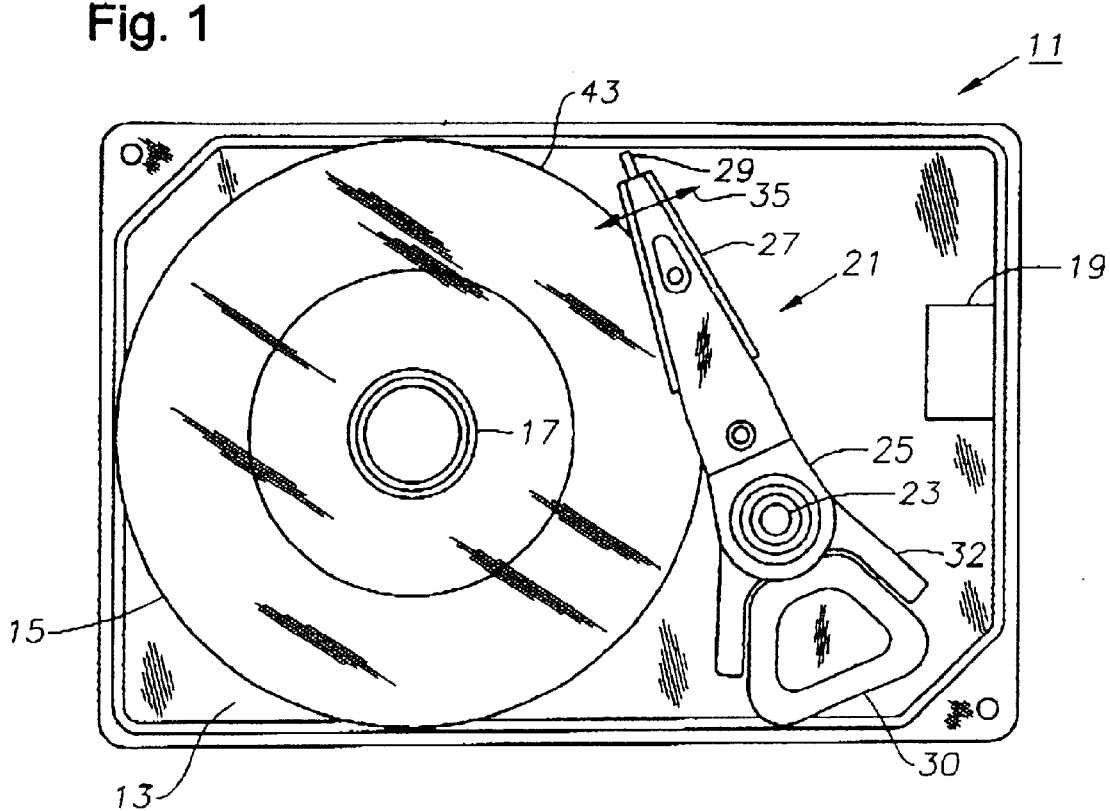
FIG. 1 is a schematic drawing of a hard disk drive.

Referring to FIG. 1, a schematic drawing of an information storage system comprising a magnetic hard disk drive 11 for a computer is shown. Drive 11 has an outer housing or base 13 containing a plurality of stacked, parallel magnetic disks 15 (one shown) which are closely spaced apart. Disks 15 are rotated by a motor located therebelow about a central drive hub or spindle 17. A plurality of stacked, parallel actuator arms 21 (one shown) are pivotally mounted to base 13 about a pivot assembly 23. A controller 19 is mounted to the base for selectively moving arms 21 relative to disks 15.

In the embodiment shown, each arm 21 comprises a mounting support 25, a pair of parallel, cantilevered load beams or suspensions 27 extending from each mounting support 25, and a head gimbal assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor assembly 30 having a conventional voice coil motor is also mounted to pivot assembly 23 opposite head gimbal assemblies 29. Movement of an actuator driver 33 (indicated by arrow 35) moves head gimbal assemblies 29 radially across tracks on the disks 15 until the heads on assemblies 29 settle on the target tracks. The head gimbal assemblies 29 operate in a conventional manner and always move in unison with one another, unless drive 11 uses a split actuator (not shown) wherein the arms move independently of one another.

Figure 2:
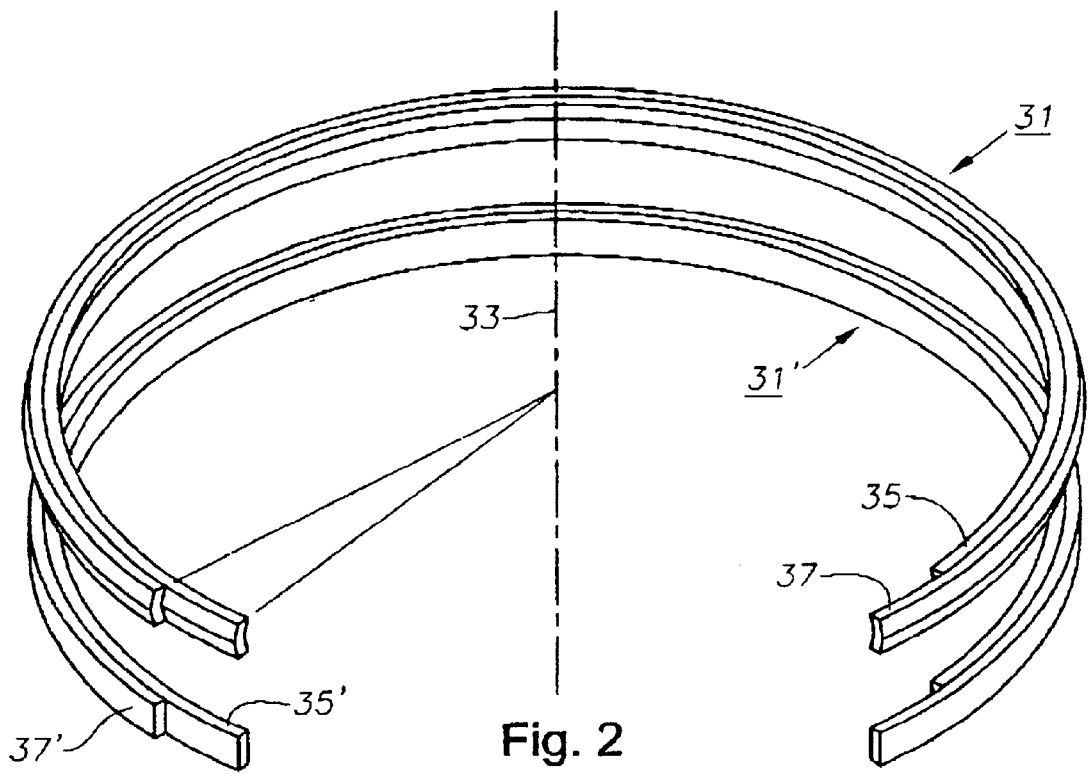
FIG. 2 is an isometric view of first and second embodiments of a balancing mechanism constructed in accordance with the invention.

Referring now to FIGS. 2 and 3, first and second embodiments of a balancing mechanism 31, 31' having a shared radial axis 33 are shown. As will become apparent, the only significant difference between the embodiments of balancing mechanisms 31, 31' is their cross-sectional shape. Each balancing mechanism 31, 31' comprises an open inner clip or ring 35, 35' and an open outer clip or ring 37, 37', respectively. Since rings 35, 35', 37, 37' are open or discontinuous rather than closed or continuous 360 degree rings, they are intentionally imbalanced about axis 33 for purposes that will be described below.

The outer radial surfaces of rings 35, 35' nest on the inner radial surfaces of rings 37, 37', respectively, to form a tight fit therebetween. In the embodiments shown, inner rings 35, 35' have their circumferential length and/or cross-section adjusted so as to yield the same imbalance as outer rings 37, 37' when in the installed configuration. For the application illustrated, each ring 35, 35', 37, 37' spans about 270 degrees relative to axis 33, and has a diameter of about 38 mm. Rings 35, 35' are shown rotated about 10 degrees relative to rings 37, 37' for better illustration of the invention, but are movable to any desired rotational orientation.

Each ring 35, 37 of balancing mechanism 31 has a generally chevron-shaped profile, while each ring 35', 37' of balancing mechanism 31' has a substantially flat, rectangular cross-sectional shape. The cross-sectional profile of rings 35, 37 allows the inner radial surface of outer ring 37 to interlock with the outer surface of inner ring 35 to prevent axial motion therebetween but allow angular reorientation. The dimensions of rings 35', 37' are approximately 1 mm in the axial direction and 0.5 mm in the radial direction. Many other cross-sectional shapes may be used. For example, each ring 35, 37 could have a concave inner radial surface and a convex outer radial surface that are complementary in shape to each other, or nesting grooves and ridges.

Figure 6:
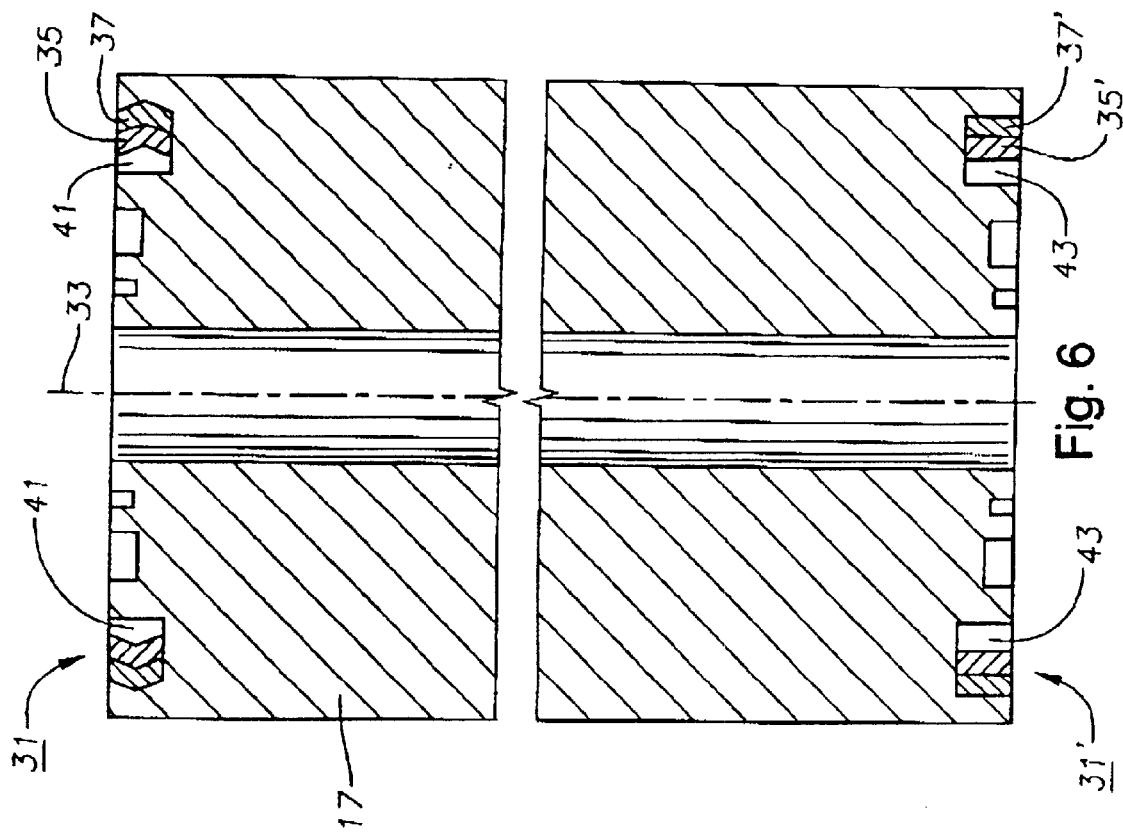
FIG. 6 is a sectional side view of the balancing mechanisms and spindle of FIG. 4.
Figure 5:
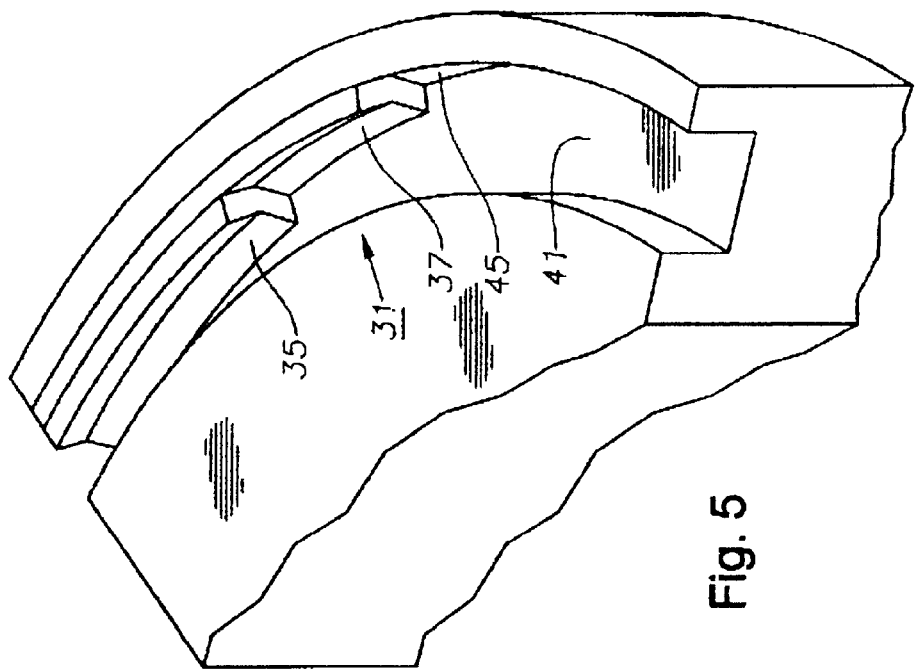
FIG. 5 is an enlarged isometric view of the balancing mechanisms and spindle of FIG. 4.
Figure 7:
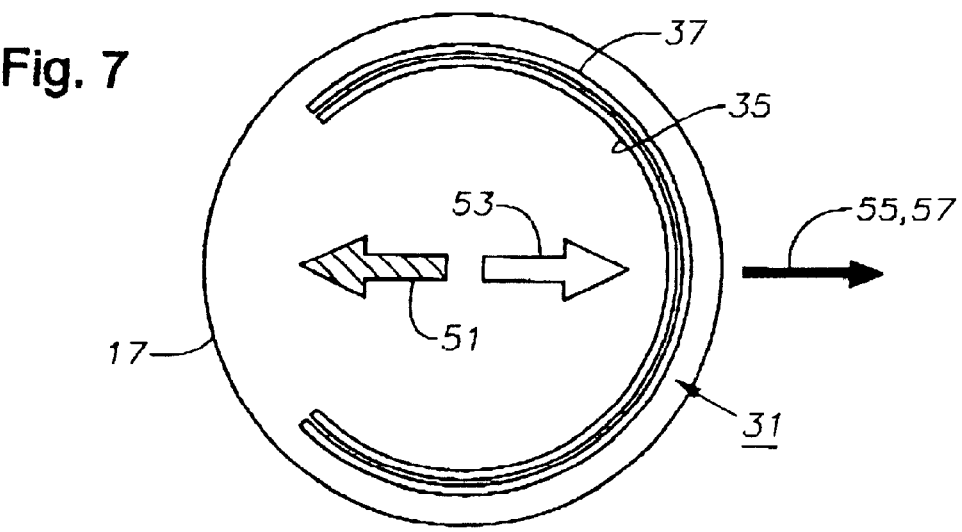
FIG. 7 is a schematic top diagram of one of the balancing mechanism and the spindle of FIG. 4 wherein the spindle has a large imbalance.

In operation (FIGS. 4–6), spindle 17 of drive 11 has a generally symmetrical design about its axis which is coincident with axis 33. Spindle has a circular upper slot 41 and a circular lower slot 43 (FIG. 6). Alternatively, spindle 17 could be formed with a single slot or more slots (not shown) anywhere along its axial length. One balancing mechanism 31 is mounted in each slot 41, 43 for two plane balancing of spindle 17. In the preferred embodiment and contrary to FIG. 6, the same embodiment of mechanism 31 is mounted in each slot 41, 43. Thus, FIG. 6 merely demonstrates the use of each mechanism 31, 31' in operation. The diameters of balancing mechanisms 31 are sized to be slightly larger than the diameter of slots 41, 43 when balancing mechanisms 31 are in a relaxed state. Thus, when balancing mechanisms 31 are inserted into slots 41, 43, they tend to expand or spring radially outward and press against the inner walls 45 of slots 41, 43 to achieve a tight fit therebetween. The tight fit reduces and/or eliminates incidental slippage or loosening during operation. Note that inner wall 45 may be configured to conform to the shape of the outer radial surface of ring 37.

During operation, an imbalance in spindle 17 may cause it to vibrate at high rotational speeds. Balancing mechanism 31 is designed to alleviate such conditions by counterbalancing the imbalance in spindle 17. For example, if spindle 17 has a large or significant imbalance 51 at the nine o-clock position, rings 35, 37 are rotated or oriented relative to each other and the imbalance 51 to compensate for it. In this example, the open ends of rings 35, 37 are aligned with each other at the nine o'clock position so that mechanism 31 pulls in the opposite direction (three o'clock) and acts as a counterbalance 53 to imbalance 51. Each ring 35, 37 has a counterbalance vector 55, 57, respectively, that coincide in this case to give mechanism 31 its maximum counterbalancing force. If the maximum force provided by a given mechanism 31 is insufficient, rings 35, 37 with larger openings or heavier rings 35, 37 should be used.

Figure 8:
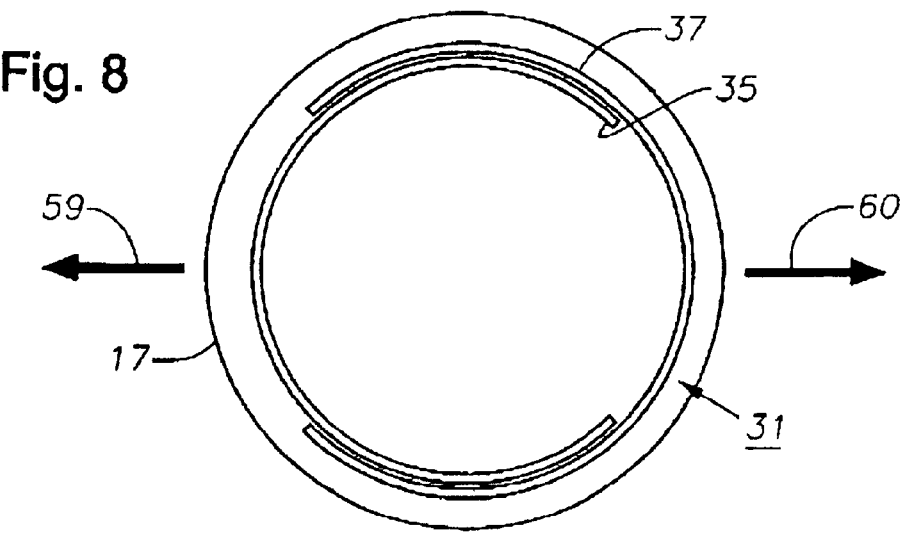
FIG. 8 is a schematic top diagram of one of the balancing mechanism and the spindle of FIG. 4 wherein the spindle has no imbalance.

A second example is illustrated in FIG. 8. Here, spindle 17 has no imbalance or is in substantially perfect balance during operation. In this circumstance, the openings in rings 35, 37 are positioned opposite of each other to nullify the counterbalancing force provided by mechanism 31 (i.e. the counterbalancing vectors 59, 60 of rings 35, 37, respectively, are oriented in opposite directions).

Figure 9:
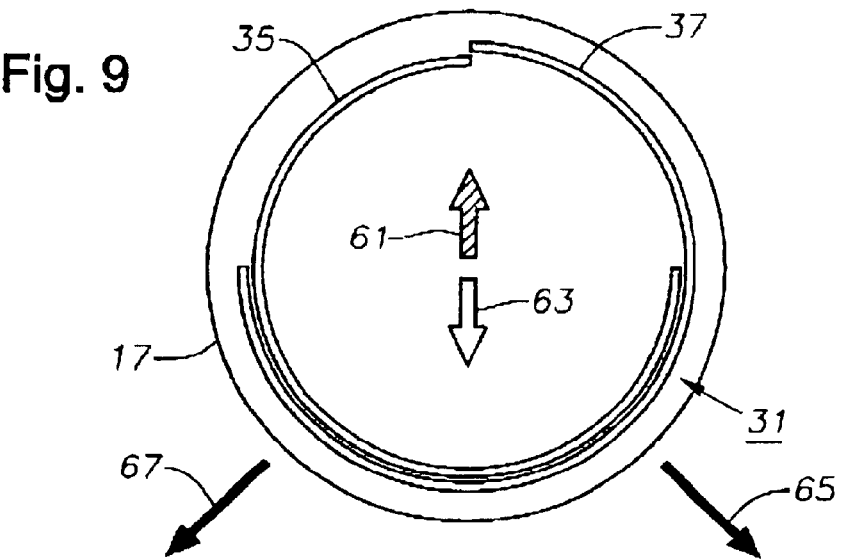
FIG. 9 is a schematic top diagram of one of the balancing mechanism and the spindle of FIG. 4 wherein the spindle has a small imbalance.

In FIG. 9, a final example illustrates a small imbalance 61 in spindle 17 at the twelve o'clock position. The open ends of rings 35, 37 are made to overlap at or near the twelve o'clock position only to the degree necessary to offset imbalance 61. Thus, mechanism 31 pulls in the opposite direction (six o'clock) and acts as a counterbalance 63 to imbalance 61. Here, the counterbalance vectors 65, 67 of rings 35, 37 are oriented at the five and seven o'clock positions, respectively. It should be apparent that rings 35, 37 of mechanism 31 may be rotated to any desired orientation relative to each other or to spindle 17 to properly compensate for imbalances therein.

In a typical application, spindle 17 has an index mark 47 that is used to give an angular reference point. When spindle 17 is mounted in an imbalance measuring device, the magnitude and angular relation of the measured imbalance at each end of spindle 17 can be measured. With this information, well known algorithms such as those described in the Machinery Handbook can be used to calculate the required correction for each end of the spindle. With the known imbalance characteristics of the rings 35, 37, the magnitude of the imbalance is selected by adjusting the angle between the openings of each element of a pair of rings 35, 37. The direction of the imbalance is determined by rotating rings 35, 37 about axis 33 relative to index mark 45. This process also may be performed by rotating rings 35, 37 relative to spindle 17 such that their discontinuities substantially align with a location of the imbalance in spindle 17, and then rotating rings 35, 37 relative to each other symmetrically about the location of the imbalance to counterbalance a magnitude of the imbalance.

The invention has several advantages including substantially infinite resolution to correct imbalances in the spindles of hard disk drives, up to the precision of the measurement and the parts. The balancing mechanism described herein can correct imbalances at both the top and the bottom of the disk pack. The mechanism adds little or no expense to the cost of the spindle and is readily adaptable to many applications. In addition, the relatively simple cross-sectional shapes of the clips may be formed at low cost by stamping or drawing processes. Finally, the clips can be removed or reworked without creating any debris.

While the invention has been shown or described in only some of its forms, it should be apparent to those skilled in the art that it is not so limited, but is susceptible to various changes without departing from the scope of the invention.

What is claimed is:

1. A hard disk drive assembly, comprising in combination:
    a base;
    a motor having a rotatable spindle with an axis mounted to the base;
    a plurality of disks mounted to the spindle;
    an actuator pivotally mounted to the base for selectively interacting with the disks;
    a balancing mechanism coaxially mounted to the spindle and having an outer ring and an inner ring, each of the rings having an imbalance and being independently rotatable relative to the spindle and to each other; wherein
    an imbalance in the spindle is counterbalanced by the balancing mechanism by rotating the rings relative to the spindle and to each other; and wherein
    each of the rings has a consistent cross-sectional profile such that the inner radial surface of the outer ring nests and interlocks with an outer surface of the inner ring to prevent axial motion therebetween but allow angular reorientation of the rings.

2. The hard disk drive assembly of claim 1 wherein each of the rings has a discontinuous opening that provides the imbalance.

3. The hard disk drive assembly of claim 1 wherein each of the rings has substantially the same imbalance when in an installed position.

4. The hard disk drive assembly of claim 1 wherein the balancing mechanism is mounted in a slot in the spindle.

5. The hard disk drive assembly of claim 4 wherein the balancing mechanism has a diameter that is larger than a diameter of the slot in the spindle to achieve a tight fit therebetween.

6. The hard disk drive assembly of claim 1 wherein each of the rings has a generally chevron-shaped cross-sectional profile.

7. The hard disk drive assembly of claim 1 wherein the spindle has circular upper and lower slots and a balancing mechanism is mounted in each of the slots for balancing the spindle in two planes.

8. A balancing mechanism for a hard disk drive assembly having a base, a motor with an axis, a spindle with a slot and rotatably mounted to the motor about the axis, a plurality of disks mounted to the spindle, and an actuator pivotally mounted to the base for selectively interacting with the disks, comprising:
    an outer ring having a radial inner surface and a radial outer surface, the outer ring being adapted to be mounted to the spindle such that the radial outer surface slidingly engages the slot to allow rotation therebetween, wherein the outer ring has a diameter that is larger than a diameter of the slot in the spindle to achieve a tight fit therebetween;
    an inner ring having a radial outer surface that nests on the radial inner surface of the outer ring, such that the inner ring is rotatable relative to the outer ring and to the spindle;
    an opening in each of the rings for creating imbalances therein, wherein each of the rings has substantially the same imbalance when in an installed position; wherein the rings are adapted to collectively counterbalance an imbalance in the spindle by rotating the rings relative to the spindle and to each other; and wherein
    each of the rings has a consistent cross-sectional profile such that the inner surface of the outer ring nests in and interlocks with the outer surface of the inner ring to prevent axial motion therebetween but allow angular reorientation of the rings, and the outer surface of the outer ring is adapted to nest in and interlock with the slot in the spindle to prevent axial motion therebetween but allow angular reorientation of the outer ring relative to the spindle; the balancing mechanism further comprising:
        second inner and outer rings identical to said inner and outer rings, respectively, wherein the second inner and outer rings are adapted to be mounted in likewise fashion to a second slot in the spindle located opposite said slot in the spindle for balancing the spindle in a second plane.

9. The balancing mechanism of claim 8 wherein each of the rings has a generally chevron-shaped profile for preventing axial movement therebetween.

* * * * *